(12) United States Patent
Christie et al.

(10) Patent No.: US 11,002,846 B2
(45) Date of Patent: May 11, 2021

(54) AMPLITUDE COMPARISON MONOPULSE RADAR SYSTEM

(71) Applicant: Arralis Holdings Limited, Hong Kong (CN)

(72) Inventors: Steven Christie, Belfast (GB); Denver Humphrey, Ballymena (GB); Michael Gleaves, County Limerick (IE); Barry Lunn, County Limerick (IE)

(*) Notice: Subject to any disclaimer, the term of this patent is extended or adjusted under 35 U.S.C. 154(b) by 378 days.

(21) Appl. No.: 15/558,511

(22) PCT Filed: Mar. 16, 2016

(86) PCT No.: PCT/EP2016/055655
§ 371 (c)(1),
(2) Date: Sep. 14, 2017

(87) PCT Pub. No.: WO2016/146666
PCT Pub. Date: Sep. 22, 2016

(65) Prior Publication Data
US 2018/0081049 A1 Mar. 22, 2018

(30) Foreign Application Priority Data
Mar. 16, 2015 (EP) .................................. 15159261

(51) Int. Cl.
*G01S 13/44* (2006.01)
*H01Q 25/00* (2006.01)
(Continued)

(52) U.S. Cl.
CPC ............ *G01S 13/4445* (2013.01); *G01S 7/03* (2013.01); *G01S 13/4463* (2013.01);
(Continued)

(58) Field of Classification Search
CPC .... G01S 13/4445; G01S 13/4463; G01S 7/03; G01S 3/245; G01S 3/40;
(Continued)

(56) References Cited

U.S. PATENT DOCUMENTS 3,979,754 A * 9/1976 Archer .................... H01Q 3/34
343/754
4,163,974 A * 8/1979 Profera ............... G01S 13/4409
342/154
(Continued)

FOREIGN PATENT DOCUMENTS

EP 0227910 A2 7/1987

OTHER PUBLICATIONS

A 94 GHz Planar Monopulse Tracking Receiver, Curtis C. Ling, IEEE 1994 (Year: 1994).*
(Continued)

*Primary Examiner* — Erin F Heard
*Assistant Examiner* — Michael W Justice
(74) *Attorney, Agent, or Firm* — Renner Kenner Greive Bobak Taylor & Weber

(57) ABSTRACT

The present invention provides an amplitude comparison monopulse radar system. The system comprises a beam forming network for coupling to the phased array antenna. The beam forming network is adapted to change the phase delays between the antenna elements in a phased array antenna such that the monopulse radiation pattern is scanned over an angular range through space.

17 Claims, 4 Drawing Sheets

(51) Int. Cl.
*H01Q 25/02* (2006.01)
*H01Q 3/40* (2006.01)
*G01S 7/03* (2006.01)
*H01Q 21/00* (2006.01)
*H01Q 3/24* (2006.01)
*G01S 13/02* (2006.01)

(52) U.S. Cl.
CPC ............... *H01Q 3/245* (2013.01); *H01Q 3/40* (2013.01); *H01Q 21/0031* (2013.01); *H01Q 25/008* (2013.01); *H01Q 25/02* (2013.01); *G01S 2013/0254* (2013.01)

(58) Field of Classification Search
CPC .. G01S 2013/0254; H01Q 3/245; H01Q 3/40; H01Q 21/0031; H01Q 25/008; H01Q 25/02
USPC ...................... 342/357.27, 154, 354, 408, 11
See application file for complete search history.

(56) References Cited

U.S. PATENT DOCUMENTS

| | | | | |
|---|---|---|---|---|
| 4,283,729 A * | 8/1981 | Richardson | ............ | H01Q 25/00 342/380 |
| 4,408,205 A * | 10/1983 | Hockham | ............. | G01S 7/2813 342/157 |
| 4,962,383 A * | 10/1990 | Tresselt | ................. | H01Q 9/285 343/700 MS |
| 5,162,803 A | 11/1992 | Chen | | |
| 5,717,405 A * | 2/1998 | Quan | ..................... | H01Q 3/22 333/117 |
| 5,926,134 A * | 7/1999 | Pons | .................. | H01Q 21/0031 342/368 |
| 2007/0285314 A1* | 12/2007 | Mortazawi | ........... | H01Q 1/3233 342/375 |
| 2010/0026574 A1* | 2/2010 | Pozgay | ..................... | H01Q 3/36 342/371 |

OTHER PUBLICATIONS

Angle Estimation for Two Unresolved Targets with Monopulse Radar, Zhen Wang, IEEE 2004 (Year: 2004).*
Model of a Monopulse Radar Tracking System for Student Laboratory, Davor Bonefacic, Radio Engineering, vol. 16, No. 3, 2007 (Year: 2007).*
Ling C.C., et al., "A 94 GHZ Planar Monopulse Tracking Receiver", IEEE Transactions on Microwave Theory and Techniques, vol. 42, No. 10, Oct. 1, 1994, pp. 1863-1871.
Lora Schulwitz, et al., "A Monopulse Rotman Lens Phased Array for Enhanced Angular Resolution", Microwave Symposium, IEEE/MTT-S International, Jun. 1, 2007, pp. 1871-1874.
Steven Christie, et al., "Liquid Crystal Based Rotman Lens Antenna With Switchable Monopulse Patterns", Microwave and Optical Technology Letters, vol. 55, No. 11, Nov. 26, 2013, pp. 2721-2726.
International Search Report and Written Opinion for International Application No. PCT/EP2016/055655, entitled "An Amplitude Comparison Monopulse Radar System", dated May 7, 2016.

* cited by examiner

AMPLITUDE COMPARISON MONOPULSE RADAR SYSTEM

This application is the U.S. National Stage of International Application No. PCT/EP2016/055655, filed Mar. 16, 2016, which designates the U.S., is published in English, and claims priority under 35 U.S.C. §§ 119 or 365(c) to EP Application No. 15159261.5, filed Mar. 16, 2015. The entire teachings of the above applications are incorporated herein by reference.

FIELD OF THE INVENTION

The present invention is concerned with RADAR systems which require a scanned beam. More particularly, the invention relates to such a radar system which can produce an amplitude comparison monopulse radiation pattern.

BACKGROUND TO THE INVENTION

The capability to locate or track a radiating source or radar target is beneficial for many communication, radar and imaging applications, such as for example military and commercial applications. One conventional method for determining the location of a target is through a mechanical scanning technique, which involves the physical movement of an antenna to track a target. Another conventional method is known as a monopulse radar system, which uses a single pulse to detect a target. This system can be implemented either through an amplitude comparison or a phase comparison.

In a conventional amplitude monopulse system, the main beams of two distinct antennas are pointed at different but closely separated directions in space in transmit mode, as is illustrated in FIG. 1. In such a system, when operating in receive mode, both the sum and difference of the received signal power of the squinted antenna patterns are measured, as is shown in FIG. 2. The sum of the received signal power provides distance information associated with a target, while the ratio of the difference and the sum of the received signal power is used to produce an error voltage which is proportional to the angular deviation of the target from the boresight. It will be appreciated that when the target is situated directly on the boresight, the error signal is zero, as the target echo amplitude is the same in both antenna beams. Fading of the echo will occur in both beams, and so this does not affect the comparison, except for the usual inaccuracies with a low signal-to-noise ratio.

While such monopulse radar systems provide high accuracy estimates of target position, they have a narrow field of view. Electronic equivalents to the mechanical scanners include True Time Delay and Phased Array antennas. These antennas offer the capability of continuously scanning over a wider field of view. However, they suffer from the drawback of having an inherently narrow bandwidths, as well as high cost and large component size and losses at W-band frequencies.

Beam forming networks can offer an attractive alternative to True Time Delay and Phased Array antennas, due to a cheaper, simpler, and more compact design, and a component count which is typically low. One type of beam forming network is known as the Rotman lens waveguide. Rotman lenses are typically used in implementations when a scanned beam is required. FIG. 3 shows the geometry of a conventional Rotman lens. It comprises a plurality of input or beam ports, a lens cavity or parallel plate region, and a plurality of output or array ports. For illustrative purposes, the lens shown in FIG. 3 has five beam ports and four array ports, but it should be appreciated that any number of ports can be used. The beam ports are situated along a focal arc at one edge of the parallel plate region of the lens, while the array ports are located on the opposite edge. The array ports are connected to an array of radiating elements or antennas through phase correction lines of unequal length. During operation, the lens is excited at one of the beam ports at a time. When each beam port is excited, a signal propagates through the parallel plate region, is sampled by the array ports, and transmitted via the phase correction lines to the array elements. The array elements then radiate the signal into free space. By switching between beam ports, the radiated beam can be scanned through the field of view of the lens.

The propagation path lengths from the beam port under excitation to the antenna elements provide a progressive linear time delay across the array. Due to constructive interference, a delay of $\Delta\tau$ between adjacent array elements, which are separated by a distance of N, produces a radiation pattern at a scan angle, $\theta_s$, relative to the central axis, which is defined by the following equation:

$$\theta_s = \sin^{-1}\left(\frac{c}{N}\Delta\tau\right)$$

where c is the speed of light in free space. The lens is a true time delay beamformer: the values of c and N are constant, and the beam scan angle depends only on the time delay, $\Delta\tau$. Providing $\Delta\tau$ is independent of frequency or has only a weak dependency on frequency, the scan angle does not vary with frequency, as is the case with phased arrays. This lens features three focal points, $F_1$, G, and $F_2$, which, when excited, form radiation patterns with peaks at $-\alpha°$, $0°$, and $\alpha°$ respectively.

To achieve a high angular resolution between beams in a conventional Rotman lens, a large number of beam ports are required. This can lead to a requirement for a high component count on the input side of the lens, as well as high spillover losses due to small port widths.

U.S. Pat. No. 3,979,754 discloses a radio frequency array antenna employing stacked parallel plate lenses. However, this antenna is not suitable for operation in the W-band frequency range. This is due to the fact that in this system the switching network is positioned between the beam forming network and the phased array antenna, which results in the complexity of the switching network which would be required for W-band operation being too great.

It is thus an object of the present invention to provide a system and method for tracking a radiating source which overcomes at least one of the above mentioned problems.

SUMMARY OF THE INVENTION

According to the invention there is provided, as set out in the appended claims, an amplitude comparison monopulse radar system comprising:
a beam forming network for coupling to a phased array antenna; wherein the beam forming network is adapted to change the phase delays between the antenna elements in a phased array antenna such that the monopulse radiation pattern is scanned over an angular range through space.

The system may further comprise a phased array antenna comprising a plurality of antenna elements for producing a monopulse radiation pattern.

The beam forming network may comprise:

a lens cavity comprising a plurality of beam ports located along the focal arc of the lens, the plurality of beam ports divided into a plurality of pairs of beam ports, wherein the system is adapted to excite each beam port pair.

The beam forming network may further comprise a plurality of lens array ports for connecting to the plurality of antenna elements, wherein the array ports are adapted to sample the signals generated through the simultaneous excitation of one or more selected beam port pairs and transmit the sampled signals to the antenna elements to produce the monopulse radiation pattern.

The system may further comprise a sum and difference generator connected to each beam port pair, wherein the sum and difference generator is adapted in transmit mode to simultaneously excite each beam port of a selected beam port pair with a signal of equal amplitude and phase such that the antenna produces a sum radiation pattern corresponding to the sum of the two signals generated from the beam port pair.

The sum and difference generator may be further adapted in receive mode to produce a signal corresponding to the sum of the power of two incoming signals from the antenna received at a selected beam port pair and to produce a signal corresponding to the difference of the power of the two signals.

The system may further comprise a phase correction line connected between each beam port of a beam port pair and the sum and difference generator, wherein the phase correction lines are adapted such that propagation path length from each beam port in a beam port pair to the centre of the array port contour is equal.

The sum radiation pattern may have its peak at the angle of $(\theta_{s1}+\theta_{s2})/2$, where $\theta_{s1}$ is the scan angle of a first beam port of a beam port pair relative to the central axis of the antenna and $\theta_{s2}$ is the scan angle of a second beam port of a beam port pair relative to the central axis of the antenna;

$$\theta_s = \sin^{-1}\left(\frac{C}{N}\Delta\tau\right)$$

and $\Delta\tau$ corresponds to the delay between adjacent antenna elements, separated by a distance of N, and c is the speed of light in free space.

The sum and difference generator may comprise a transmission line.

The transmission line may comprise one of a microstrip, a stripline, a substrate integrated waveguide or a four-port network.

The transmission line may comprise a four-port network, and wherein a first port of the four-port network is connected to a first beam port of each beam port pair and a second port of the four-port network is connected to a second beam port of each beam port pair, and wherein a third port of the four-port network corresponds to a sum port and a fourth port corresponds to a delta port, wherein the sum port is adapted in transmit mode to simultaneously excite each beam port of a selected beam port pair via the first port of the four-port network and the second port of the four-port network and the sum port is adapted in receive mode to produce a signal corresponding to the sum of the power of two signals received at a selected beam port pair via the first port of the four-port network and the second port of the four-port network, and wherein the delta port is adapted in receive mode to produce a signal corresponding to the difference of the power of two signals received at the selected beam port pair via the first port of the four-port network and the second port of the four-port network.

The four-port network may comprise one of: a magic tee waveguide, a hybrid coupler, or a switched delay line.

The sum of the power of the two signals received at a selected beam port pair may provide distance information associated with a target for detection by the antenna.

The ratio of the difference and the sum of the power of two signals received at a selected beam port pair may provide direction information associated with a target for detection by the antenna.

The plurality of beam ports may be located along the focal arc of the lens and the plurality of array ports are located opposite the beam ports.

The plurality of beam ports may be of even number.

Each beam port pair may comprise a pair of adjacent beam ports.

The system may further comprise a switching network for exciting the one or more selected beam port pairs.

The beam forming network may comprise one of: a Rotman lens, a RKR lens, a Butler matrix or a Blaas matrix.

The system may be adapted to generate and receive radio frequency, RF, signals.

The RF signals may comprise RF signals in the W-band frequency range.

The signals may comprise a pulse signal or a FMCW signal.

In another embodiment of the invention there is provided an amplitude comparison monopulse radar system for generating and receiving RF signals in the W-band frequency range comprising:

a phased array antenna comprising a plurality of antenna elements for producing a monopulse radiation pattern; and a beam forming network coupled to the phased array antenna; wherein the beam forming network is adapted to change the phase delays between the antenna elements in the phased array antenna such that the monopulse radiation pattern of the phased array antenna is scanned over an angular range through space.

In an embodiment of the system according to the invention, the beam forming network is directly coupled to the phased array antenna.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The present invention implements an amplitude monopulse radar system, where the sum and difference patterns can be scanned through space, unlike conventional static amplitude monopulse systems. The system of the invention thus comprises a beam forming network for coupling to a phased array antenna and adapted to change the phase delays between the antenna elements in a phased array antenna such that the monopulse radiation pattern may be scanned over an angular range through space.

One embodiment of the system will now be described with reference to FIGS. 4 to 7, where the beam forming network comprises a Rotman lens, and it is shown coupled to a phased array antenna. In accordance with the present invention, adjacent located beam ports of the Rotman lens are paired off, in order to provide a plurality of beam port pairs. Phase correction lines of unequal length are then employed to feed the beam port pairs. The lengths of these phase correction lines are varied to impose an equal propagation path length from each beam port in the pair to the centre of the array port contour (0,0), as can be seen from FIG. 4.

Figure 1:
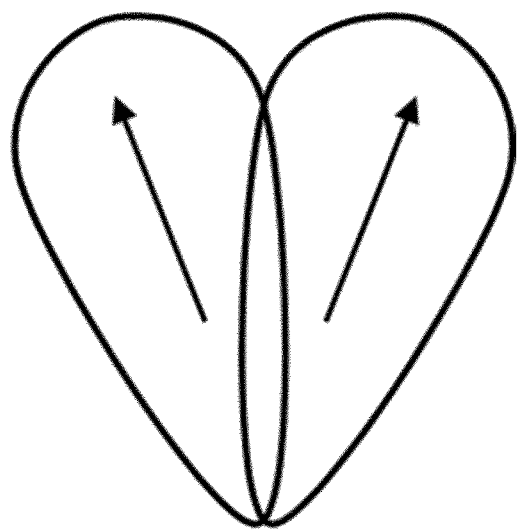
FIG. 1 shows the two squinted antenna beams required for an amplitude comparison monopulse system.
Figure 2:
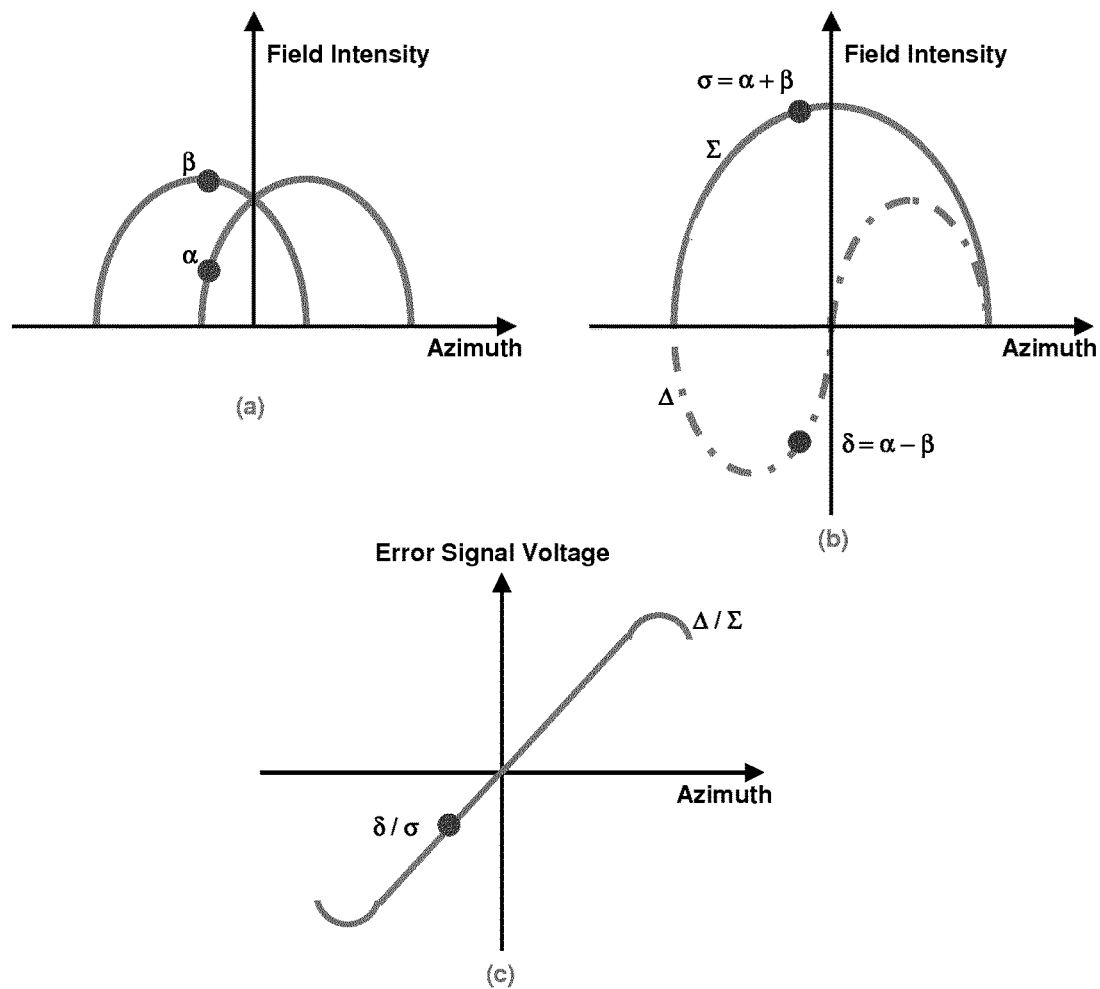
FIG. 2 shows how direction is calculated from an amplitude comparison monopulse system where (a) shows the individual received patterns (b) shows the sum and difference of these patterns (c) shows the error discrimination curve.
Figure 3:
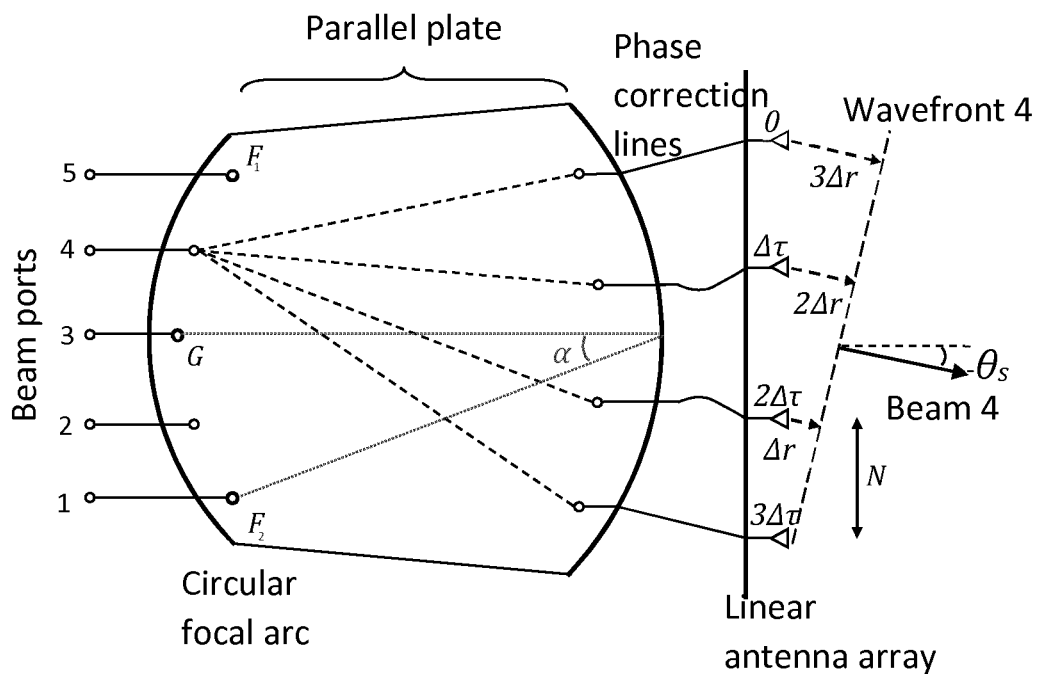
FIG. 3 shows the geometry of a conventional Rotman lens.
Figure 4:
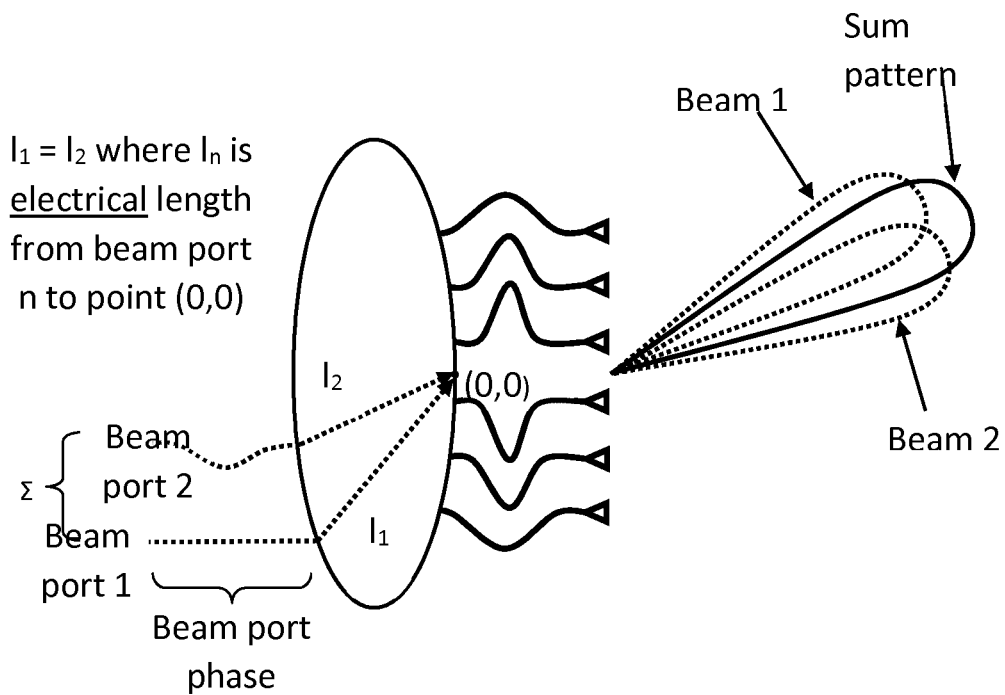
FIG. 4 shows the system of the present invention when operating in transmit mode, and a beam port pair is producing a monopulse sum radiation pattern.

As a result of this arrangement, during operation of the system in transmit mode, when two paired beam ports are simultaneously excited with equal amplitude and phase, the addition of the phase correction lines produces a sum radiation pattern which has its peak at the angle $(\theta s_1 + \theta s_2)/2$, half-way between the scan angles to the central axis corresponding to the individual beam ports (denoted $\theta s_1$ and $\theta s_2$), as is shown in FIG. 4. Thus, this enables the monopulse main beam direction to be moved in angle and space, as each pair of beam ports are selected sequentially for excitation. Additionally, through exciting two adjacent beam ports in phase, the focusing of the signal onto the lens array ports is enhanced, which reduces the power loss due to a portion of the signal being incident on the lens sidewalls and being absorbed, a phenomenon known as spillover loss.

Figure 6:
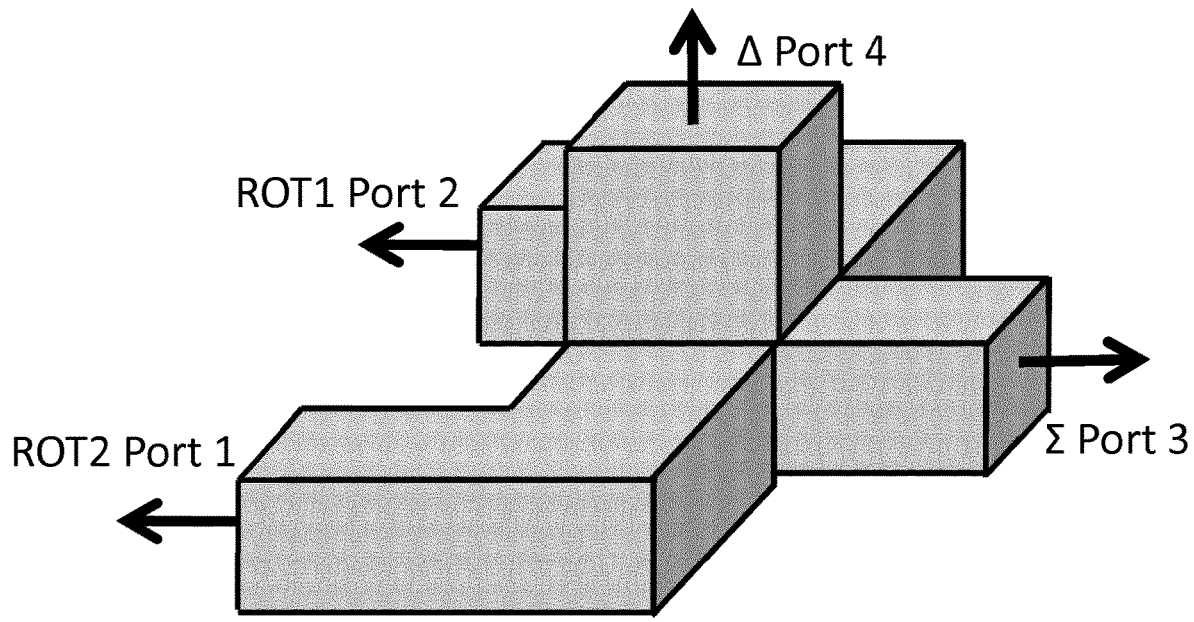
FIG. 6 shows an embodiment of the invention when a 'magic tee' four-port network is connected to a pair of beam ports.

In accordance with this embodiment of the invention, the generation of the sum and difference patterns of the amplitude monopulse in transmit and receive modes is facilitated through the use of a four-port network in the form of a magic tee, as shown in FIG. 6. Each of the Rotman lens beam port pairs is connected through the phase correction lines to ports 1 and 2 of the magic tee network (in FIG. 6, port 1 of the Rotman lens is shown coupled to port 2 of the magic tee, while port 2 of the Rotman lens is coupled to port 1 of the magic tee. However, it will be appreciated that alternatively port 1 of the Rotman lens could be coupled to port 1 of the magic tee, and port 2 of the Rotman lens coupled to port 2 of the magic tee). The remaining two ports on the magic tee network, ports 3 and 4, are denoted the sum (Σ) and delta (Δ) port respectively. During transmit mode, excitation of the magic tee at the Σ port excites ports 1 and 2, which feed the Rotman lens beam port pair with equal phase and amplitude, producing a sum radiation pattern which has its peak directed at an angle of $(\theta s_1 + \theta s_2)/2$, as explained above.

Figure 5:
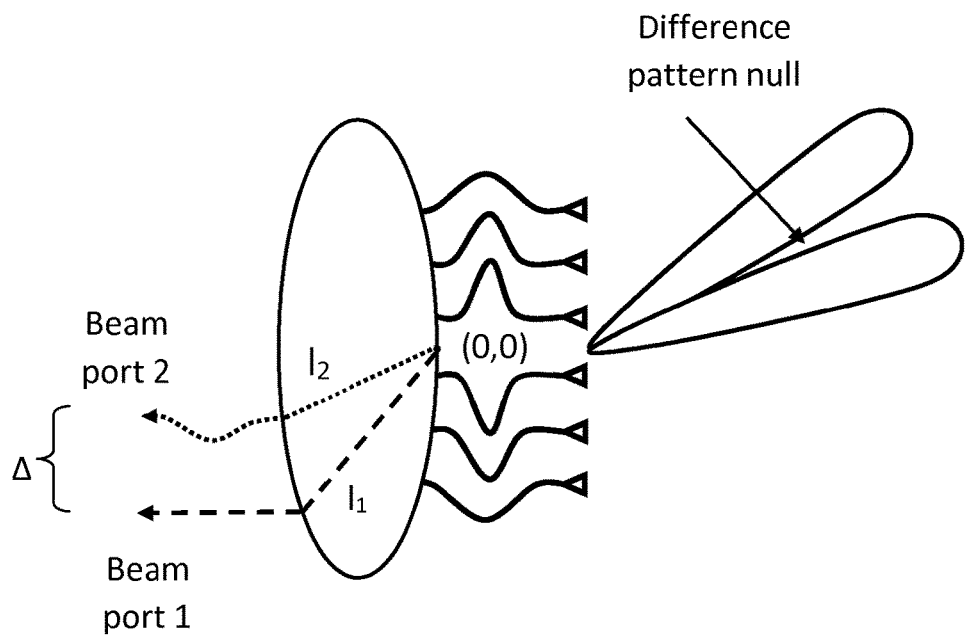
FIG. 5 shows the system of the present invention when operating in receive mode, and the difference pattern null when the delta port is fed from a beam port pair.

In the same manner, due to reciprocity, during receive mode, ports 1 and 2 of the Rotman lens excite ports 1 and 2 of the magic tee network, producing a signal at the Σ port of the magic tee which is the sum of the waves at the two paired beam ports. Furthermore, the signal produced at the Δ port in receive mode corresponds to the difference of the two waves transmitted to the magic tee network from the Rotman lens beam port pair. Accordingly, for a signal received by the antenna array which now arrives at an angle of incidence of $(\theta s_1 + \theta s_2)/2$, the Σ signal has a large magnitude, whilst the Δ signal has a magnitude of 0. As the angle of incidence moves away from $(\theta s_1 + \theta s_2)/2$, Δ becomes greater than 0, the magnitude and phase of which provide an error value which can be used to accurately estimate the angular position of the target, and now corresponds to an angle away from $(\theta s_1 + \theta s_2)/2$, as is shown in FIG. 5. A circulator is used to decouple the transmit mode source signal from the receive mode signal incoming from the antenna array.

Thus, by combining the waves received at the two Rotman lens paired beam ports using the Σ and Δ ports of the magic tee, and consecutively analysing each pair of beam ports in turn, amplitude comparison monopulse can be achieved. The sum of the power of the two signals received at a selected beam port pair provides distance information associated with a target for detection by the antenna, while the ratio of the difference and the sum of the power of two signals received at a selected beam port pair provides direction information associated with a target for detection by the antenna. As the invention is implemented in two orthogonal directions, it enables target tracking to be maintained in both azimuth and elevation directions.

Due to the plurality of Rotman lens beam port pairs, each of which has a separate and distinct corresponding scan angle, $(\theta s_1 + \theta s_2)/2$, which depends on the angular position of the beam port pair along the circular focal arc, the monopulse beam direction can be scanned over a wide angular range, with no requirement for any mechanical scanning or phase shifters.

It should be understood that the phase correction lines ensure proper phasing of the beam port excitations. Thus, when any one beam port pair is excited with a signal, the waves transmitted by each individual beam port always arrive at the centre of the array contour, (0,0), in phase. This is necessary to produce a properly formed sum radiation pattern in transmit mode, and to ensure the correct relative phasing of the signals at ports 1 and 2 of the magic tee in receive mode, which is critical for correct Σ and Δ outputs. Additionally, this has the desirable side effect of reducing spillover loss, by enhancing the focusing of the signal onto the lens array ports.

Figure 7:
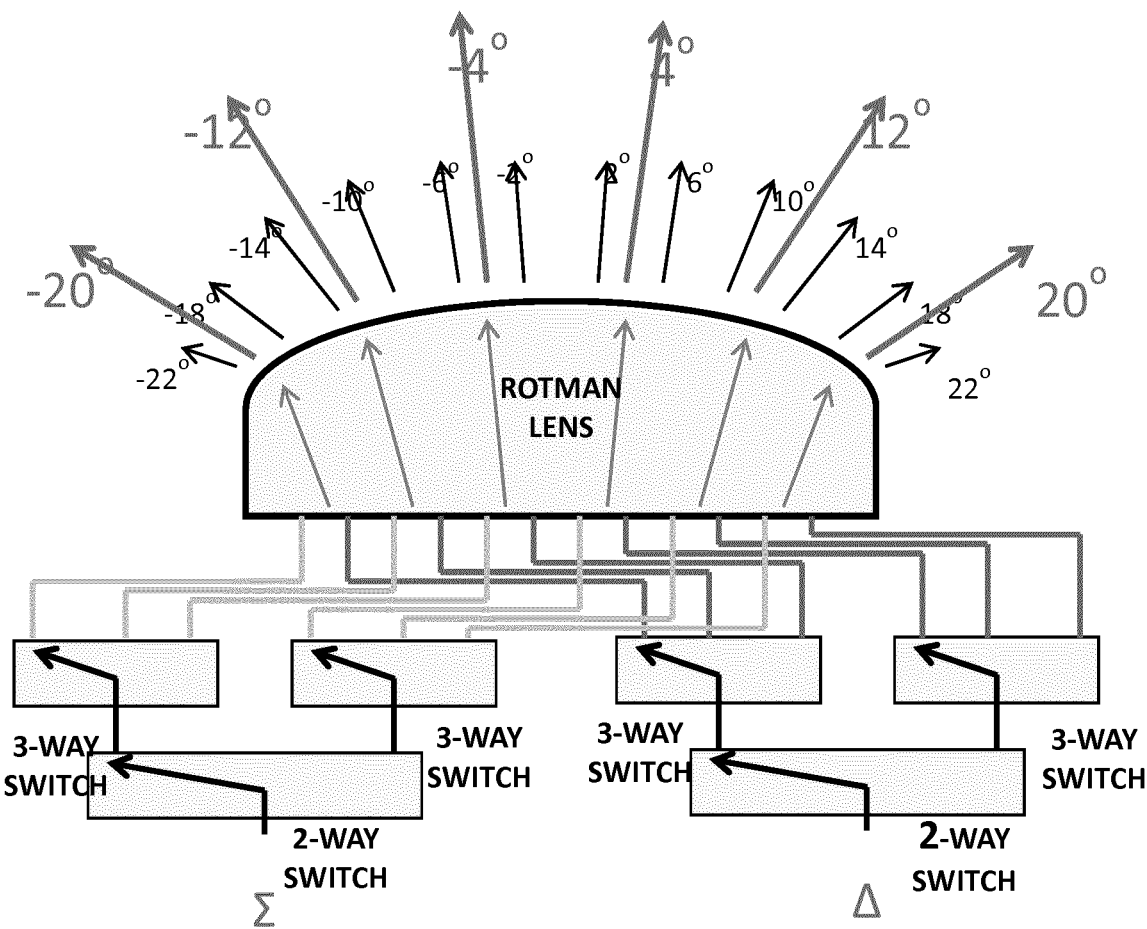
FIG. 7 shows an embodiment of the invention which makes use of a switching network.

In the embodiment of the invention shown in FIG. 7, a switching network is used to switch between beam port pairs. This enables one single transmit and one single receive chain to be used, rather than one transmit and one receive chain per pair. It should also be understood that the invention could equally well be implemented with the location of the switching network relative to the magic tees reversed. In addition, the invention can provide retrodirective capability by using the switching network to terminate beam ports with reflective loads. Retrodirective functionality allows the lens to automatically retransmit a received signal back in the direction of its source. This could be achieved passively, by terminating the beam ports using either open or short circuit loads, which have a reflection co-efficient of magnitude 1. Active implementations, using reflection amplifiers as loads at the beam ports for example, would allow the reflected signal to be modulated and amplified in power. In the case of a retrodirective lens, the distances from each beam port to the point (0,0) would all be made equal by the use of the phase correction lines.

The system of the present invention is adapted to generate and receive radio frequency (RF) signals. The signals may be a pulse signal or a Frequency Modulated Continuous Wave (FMCW) signal. The RF signals may be in the W-band frequency range, or in any other desired lower or higher frequency range. At W-band frequencies a waveguide may be used as the transmission medium, due to its low loss. However, alternative transmission mediums could also be used, such as micro-strip, strip-line or substrate integrated waveguide, for example at lower frequencies, in view of their relative ease and cheap cost of fabrication.

While the invention has been explained above where the beam forming network is implemented using a Rotman lens, it should be understood that alternative beam forming networks could equally well be used, some of which may provide a wider field of view. These may include for example the RKR lens (which is a circular constrained lens), the Butler matrix, and the Blaas matrix. In addition, it should be understood that any even number of beam ports may be used. In this regard, it should be understood that the invention could be implemented with a Rotman lens which has an odd number of beam ports, so long as one beam port is not used. Increasing the number of beam ports allows a larger number of beams within the Rotman lens field of view, and thereby increases the angular resolution of the lens. Furthermore, while the invention has been described using pairs of adjacent beam ports excited in sequence, it will be appreciated that in alternative embodiments of the invention the beam ports pairs may not be located adjacent to each other, and/or more than one beam port pair could be simultaneously excited. Any number of array ports may also be used. A larger number of array ports may lead to a reduction in spillover losses, increase the radiation pattern gain, and provide narrower beams, and hence increase angular resolution. However, a smaller number of array ports reduces the complexity of the lens design, and allows for more simple routing of the waveguide (or other) phase correction lines feeding the array. It should also be appreciated that while the invention has been described using a magic tee four-port network, a rat-race or hybrid ring coupler could equally well be used. Such a coupler may be best suited for implementations with planar transmission lines.

The present invention provides numerous advantages when compared to conventional radar systems. In contrast to a conventional amplitude monopulse system, the position of the delta null and sum peak can be moved away from the boresight, in order to provide a wider angular target track. Furthermore, this is achieved through the simple switching between beam port pairs of the Rotman lens, with no requirement for mechanical scanning or phase shifters, which tend to be large and lossy. The system also provides faster wide angle monopulse target tracking when compared to a mechanically steered monopulse system.

When compared to a conventional Rotman lens, the system of the present invention additionally provides improved coupling between input and output ports in transmit mode, as well as reduced loss, due to reduced signal spillover onto the lens sidewalls as a result of feeding beam ports in pairs.

Furthermore, the system provides improved angular resolution with no increase in the number of beam ports. It should also be noted that no increase in sum and difference module component count is required for an increase in the number of beam ports.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms "include, includes, included and including" or any variation thereof are considered to be totally interchangeable and they should all be afforded the widest possible interpretation and vice versa. The invention is not limited to the embodiments hereinbefore described but may be varied in both construction and detail.

The invention claimed is:

1. An amplitude comparison monopulse radar system for generating and receiving RF signals in the W-band frequency range, comprising:
   a phased array antenna comprising a plurality of antenna elements for producing a monopulse radiation pattern;
   a beam forming network coupled to the phased array antenna, the beam forming network being adapted to change the phase delays between the antenna elements in the phased array antenna such that the monopulse radiation pattern of the phased array antenna is scanned over an angular range through space,
   wherein the beam forming network includes:
     a lens having a plurality of beam ports,
     a lens cavity, and
     a plurality of array ports for connecting to the plurality of antenna elements, the plurality of array ports defining an array port contour with a centre;
   wherein the plurality of beam ports include a plurality of beam ports pairs, and in transmit mode, the beam ports of each respective beam port pairs are arranged to be simultaneously excited; and
   wherein each of the plurality of array ports are adapted to sample signals generated through simultaneous excitation of one or more selected beam port pairs and transmit the sampled signals to the antenna elements to produce the monopulse radiation pattern;
     a plurality of sum and difference generators, each respective one of the sum and difference generators is connected to a respective one of the beam port pairs; and
     a plurality of phase correction lines each connected between a beam port of a beam port pair and the corresponding sum and difference generator, wherein the phase correction lines are adapted such that a propagation path length from each beam port in each selected beam port pair to the centre of the array port contour is equal.

2. The system of claim 1, wherein the sum and difference generator is adapted in transmit mode to simultaneously excite each beam port of a corresponding beam port pair with a signal of equal amplitude and phase such that the antenna produces a sum radiation pattern corresponding to the sum of the two signals generated from the corresponding beam port pair.

3. The system of claim 2, wherein the sum and difference generator is further adapted in receive mode to produce a signal corresponding to the sum of the power of two incoming signals from the antenna received at the corresponding beam port pair and to produce a signal corresponding to the difference of the power of the two signals.

4. The system of claim 3, wherein the sum and difference generator comprises a transmission line.

5. The system of claim 4, wherein the transmission line comprises a microstrip.

6. The system of claim 4, wherein the transmission line comprises a four-port network.

7. The system of claim 6, wherein the four-port network comprises:
   a first port connected to a first beam port of a beam port pair,
   a second port connected to a second beam port of the beam port pair,
   a third port corresponding to a sum port, and
   a fourth port corresponding to a delta port,
wherein the sum port is adapted in transmit mode to simultaneously excite the beam port of the beam port pair via the first port and the second port, and the sum port is adapted in receive mode to produce a signal corresponding to the sum of the power of two signals received at a beam port pair via the first port and the second port, and
wherein the delta port is adapted in receive mode to produce a signal corresponding to the difference of the power of two signals received at the beam port pair via the first port and the second port.

8. The system of claim 7, wherein the four-port network comprises one of: a magic tee waveguide, a hybrid coupler, or a switched delay line.

9. The system of claim 4, wherein the transmission line comprises a stripline.

10. The system of claim 4, wherein the transmission line comprises a substrate integrated waveguide.

11. The system of claim 3, wherein the sum of the power of the two signals received at a corresponding beam port pair provides distance information associated with a target for detection by the antenna.

12. The system of claim 3, wherein the ratio of the difference and the sum of the power of two signals received at a corresponding beam port pair provides direction information associated with a target for detection by the antenna.

13. The system of claim 1, wherein the sum radiation pattern has its peak at the angle of $(\theta s_1+\theta s_2)/2$, where $\theta s_1$ is the scan angle of a first beam port of a beam port pairs relative to a central axis of the antenna and $\theta s_2$ is the scan angle of a second beam port of the beam port pair relative to the central axis of the antenna;

$$\theta_s - \sin^{-1}\left(\frac{C}{N}\Delta\tau\right)$$

and $\Delta\tau$ corresponds to the delay between adjacent antenna elements, separated by a distance of N, and c is the speed of light in free space.

14. The system of claim 1, wherein the plurality of beam ports are located along a focal arc of the lens, and the plurality of array ports are located opposite the beam ports.

15. The system of claim 1, wherein the lens is a Rotman lens.

16. The system of claim 1, wherein each of the sum and difference generators comprises a four-port network.

17. The system of claim 16, wherein each of the four-port networks comprises a magic tee waveguide or a hybrid ring coupler.

* * * * *